US010015866B2

(12) United States Patent
Recker et al.

(10) Patent No.: US 10,015,866 B2
(45) Date of Patent: Jul. 3, 2018

(54) SMART PHONE CONTROLLED WIRELESS LIGHT BULB

(71) Applicants: Michael V. Recker, Gaithersburg, MD (US); David B. Levine, Pepper Pike, OH (US)

(72) Inventors: Michael V. Recker, Gaithersburg, MD (US); David B. Levine, Pepper Pike, OH (US)

(73) Assignee: Wireless Environment, LLC, Mayfield Village, OH (US)

( * ) Notice: Subject to any disclaimer, the term of this patent is extended or adjusted under 35 U.S.C. 154(b) by 334 days.

(21) Appl. No.: 14/164,548

(22) Filed: Jan. 27, 2014

(65) Prior Publication Data

US 2014/0139137 A1    May 22, 2014

Related U.S. Application Data

(63) Continuation of application No. 11/847,509, filed on Aug. 30, 2007, now Pat. No. 8,669,716.

(51) Int. Cl.
*H05B 37/02* (2006.01)

(52) U.S. Cl.
CPC .......... *H05B 37/0272* (2013.01); *Y02B 20/48* (2013.01)

(58) Field of Classification Search
CPC  F21V 23/0435; F21V 23/045; H05B 37/0272
See application file for complete search history.

(56) References Cited

U.S. PATENT DOCUMENTS

| 4,323,820 A | 4/1982 | Teich |
| 4,854,690 A | 8/1989 | Mehr |

(Continued)

FOREIGN PATENT DOCUMENTS

| WO | WO 03/083811 | 10/2003 |
| WO | WO2005/024898 | * 3/2005 |

(Continued)

OTHER PUBLICATIONS

Supplementary European Search Report and Opinion dated May 16, 2013, issued in European Application No. 08828752.9 (7 pages).

(Continued)

*Primary Examiner* — Julie Bannan
(74) *Attorney, Agent, or Firm* — Finnegan, Henderson, Farabow, Garrett & Dunner, LLP

(57) ABSTRACT

The claimed subject matter provides systems and/or methods that employ a control component integrated in a light bulb to control the light bulb wirelessly. The wireless light bulb can include a light source, a control component that manages operation of the light source, an input component that wirelessly obtains input signals that can be utilized by the control component, and a power source. For instance, the light source can be one or more light emitting diodes (LEDs) and/or the power source can be one or more batteries. Moreover, the input component can receive the input signals (e.g., radio frequency, infrared, . . . ) from a remote control, a sensor, a differing wireless light bulb, a radio frequency identifier (RFID) tag, etc. Further, the wireless light bulb can be mechanically coupled to a lighting fixture, where the lighting fixture may or may not be electrically coupled to an alternating current (AC) power source.

16 Claims, 10 Drawing Sheets

(56) References Cited

U.S. PATENT DOCUMENTS

| | | | |
|---|---|---|---|
| 4,963,798 A | 10/1990 | McDermott | |
| 5,126,634 A | 6/1992 | Johnson | |
| 5,357,170 A | 10/1994 | Luchacho et al. | |
| 5,489,827 A | 2/1996 | Xia | |
| 6,010,228 A | 1/2000 | Blackman et al. | |
| 6,166,627 A | 12/2000 | Reeley | |
| 6,340,864 B1 | 1/2002 | Wacyk | |
| 6,404,079 B1 | 6/2002 | Hsieh | |
| 6,548,947 B2 | 4/2003 | Dowling et al. | |
| 6,703,788 B1 | 3/2004 | Miller et al. | |
| 6,759,954 B1 | 7/2004 | Myron et al. | |
| 6,759,966 B1 | 7/2004 | Weng | |
| 6,808,287 B2 | 10/2004 | Lebens et al. | |
| 6,957,043 B2 | 10/2005 | Angermann et al. | |
| 6,965,209 B2 | 11/2005 | Piepgras et al. | |
| 6,979,100 B2 | 12/2005 | Reiff et al. | |
| 7,145,265 B2 | 12/2006 | McNulty et al. | |
| 7,218,056 B1* | 5/2007 | Harwood | G08B 7/066 307/66 |
| 7,227,444 B2 | 6/2007 | Fitzgibbon | |
| 7,429,919 B2 | 9/2008 | Silic | |
| 7,486,883 B2 | 2/2009 | McNary | |
| 7,498,952 B2 | 3/2009 | Newman, Jr. | |
| 7,604,370 B2 | 10/2009 | Dowdy et al. | |
| 7,639,115 B2 | 12/2009 | Valoteau et al. | |
| 2003/0095406 A1 | 5/2003 | Lebens et al. | |
| 2003/0137258 A1 | 7/2003 | Piepgras et al. | |
| 2003/0141819 A1 | 7/2003 | Cojocary | |
| 2003/0199247 A1* | 10/2003 | Striemer | H04B 7/155 455/11.1 |
| 2004/0212321 A1 | 10/2004 | Lys et al. | |
| 2004/0264187 A1* | 12/2004 | Vanderschuit | F21S 6/005 362/235 |
| 2005/0064818 A1* | 3/2005 | Assarsson | H04W 74/006 455/41.2 |
| 2005/0099824 A1 | 5/2005 | Dowling et al. | |
| 2005/0104747 A1 | 5/2005 | Silic et al. | |
| 2005/0248930 A1 | 11/2005 | Naval et al. | |
| 2005/0259416 A1 | 11/2005 | Gauna et al. | |
| 2006/0044152 A1 | 3/2006 | Wang | |
| 2006/0146527 A1 | 7/2006 | VanderSchuit | |
| 2006/0176689 A1 | 8/2006 | Dowdy et al. | |
| 2007/0007898 A1* | 1/2007 | Bruning | H05B 33/0821 315/34 |
| 2007/0043540 A1 | 2/2007 | Cleland et al. | |
| 2007/0045524 A1* | 3/2007 | Rains, Jr. | F21K 9/00 250/228 |
| 2007/0195526 A1* | 8/2007 | Dowling | H05B 33/0857 362/234 |
| 2007/0195544 A1* | 8/2007 | Graves, Jr. | F21K 9/13 362/510 |
| 2007/0211461 A1 | 9/2007 | Harwood | |
| 2007/0273539 A1 | 11/2007 | Gananatha | |
| 2008/0232082 A1 | 9/2008 | Martinez | |
| 2010/0141153 A1 | 6/2010 | Recker et al. | |

FOREIGN PATENT DOCUMENTS

| | | |
|---|---|---|
| WO | WO 2009029960 | 3/2009 |
| WO | WO 2010063001 | 6/2010 |

OTHER PUBLICATIONS

U.S. Appl. No. 11/692,075, Non-Final Office Action dated Mar. 19, 2010, 13 pgs.
U.S. Appl. No. 11/692,075, Non-Final Office Action dated Oct. 5, 2010, 16 pgs.
U.S. Appl. No. 12/626,640, Non-Final Office ACtion dated Sep. 1, 2010, 7 pgs.
U.S. Appl. No. 12/626,640, Non-Final Office Action dated Sep. 30, 2010, 7 pgs.
U.S. Appl. No. 12/626,640, Non-Final Office Action dated Sep. 1, 2010, 8 pgs.
International Preliminary Report on Patentability, PCT/US2008/081807, dated Mar. 2, 2010, 6 pgs.
Written Opinion of the International Search Authority, PCT/US2008/081807, dated Mar. 2, 2009, 5 pgs.
ISR, PCT/US2009/066003, Search Report and Written Opinion, dated Mar. 4, 2010; 11 pgs.
ISR, PCT/US2008/081897, (dated Mar. 5, 2009), all.

* cited by examiner

SMART PHONE CONTROLLED WIRELESS LIGHT BULB

This application is a continuation of application Ser. No. 11/847,509, filed Aug. 30, 2007, which is incorporated herein by reference.

TECHNICAL FIELD

The subject application relates to wireless lighting. More particularly, the subject application relates to systems and methods that employ a control component integrated in a light bulb to control the light bulb wirelessly.

BACKGROUND

Light can be yielded by a variety of sources. For instance, combustion-based sources, electric sources, and the like can generate light, which can be employed for various illumination purposes. Combustion-based sources include fires, torches, candles, kerosene lamps, etc.; however, combustion-based lighting can present safety concerns, and thus, may be impractical for various types of lighting situations. Electric sources such as incandescent lamps, electroluminescent lamps, gas discharge lamps, high-intensity discharge lamps, and so forth can mitigate potential for harm associated with combustion-based sources. Nevertheless, when conventional electric sources are employed to illuminate indoor or outdoor areas, significant amounts of time and costs (e.g., related to wiring) art commonly incurred for installation (e.g., to hard-wire a fixture or an outlet to be utilized by a portable lamp) in a desired location and/or replacement. Moreover, portable lamps oftentimes have cords that can be aesthetically unpleasing, easily unplugged and/or can present additional safety concerns (e.g., an individual can trip over a cord, a pet can chew on the cord, an overloaded outlet with too many items plugged in can increase a chance of fire, . . . ).

According to an illustration, a light fixture positioned at the bottom of a stairway in a basement can be controlled by a pull chain. To switch the light on, one commonly traverses the stairs while the light is not illuminated and then pulls the chain to cause the light to turn on. Such a lighting scenario can be a safety hazard to a person that ascends and descends the stairs without the benefit of the light being illuminated (e.g., a misstep upon the stairs, which can be a more frequent occurrence in the dark, can lead to falling down the stairs, . . . ). Additionally, installing a switch at the top of the steps that controls the fixture can be costly and time consuming.

Pursuant to another example, a person can desire to install a light fixture at a particular location. Conventionally, however, such installation can necessitate hard-wiring the light fixture to a power source that can be leveraged for illuminating lights coupled with the light fixture. Yet, hard-wiring the light fixture can be expensive and time consuming at best. Further, an inexperienced individual can improperly wire the light fixture, which can lead to a potential fire hazard, etc.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate remotely controlling a light bulb wirelessly utilizing one or more components embedded in the bulb. By way of illustration, the components can be hardware, software, and/of firmware; for instance, a component can be an electrical circuit, a processor, an executable, a process, a program, and so forth. The wireless light bulb can include a light source, a control component that manages operation of the light source, an input component that wirelessly obtains input signals that can be utilized by the control component, and a power source. Additionally, the light source, the control component, the input component, and the power source can be integrated in a housing of the wireless light bulb. For instance, the light source can be one or more light emitting diodes (LEDs) and/or the power source can be one or more batteries. Moreover, the input component can receive the input signals (e.g., radio frequency, infrared, . . . ) from a remote control, a sensor, a differing wireless light bulb, a radio frequency identifier (RFID) tag, etc. Further, the wireless light bulb can be mechanically coupled to a lighting fixture, where the lighting fixture may or may not be electrically coupled to an alternating current (AC) power source.

According to one or more aspects of the claimed subject matter, a wireless light bulb can include a housing that includes a fitting that can physically couple with a socket of a lighting fixture. Moreover, the lighting fixture can be mounted, positioned, installed, etc. at substantially any location, yet the lighting fixture need not be hard-wired. Rather, the power source integrated in the wireless light bulb can be utilized instead of or in addition to AC power provided to the wireless light bulb from the lighting fixture. According to another illustration, the wireless light bulb can be powered by an external AC power source (e.g., the wireless light bulb can include or can lack the power source integrated therein). Further, a remote control, sensor, and the like can be utilized to wirelessly control operation of the wireless light bulb; thus, a remote control switch can be positioned at a desired location without being hard-wired and can transmit commands that effectuate modifying operation of the wireless light bulb.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
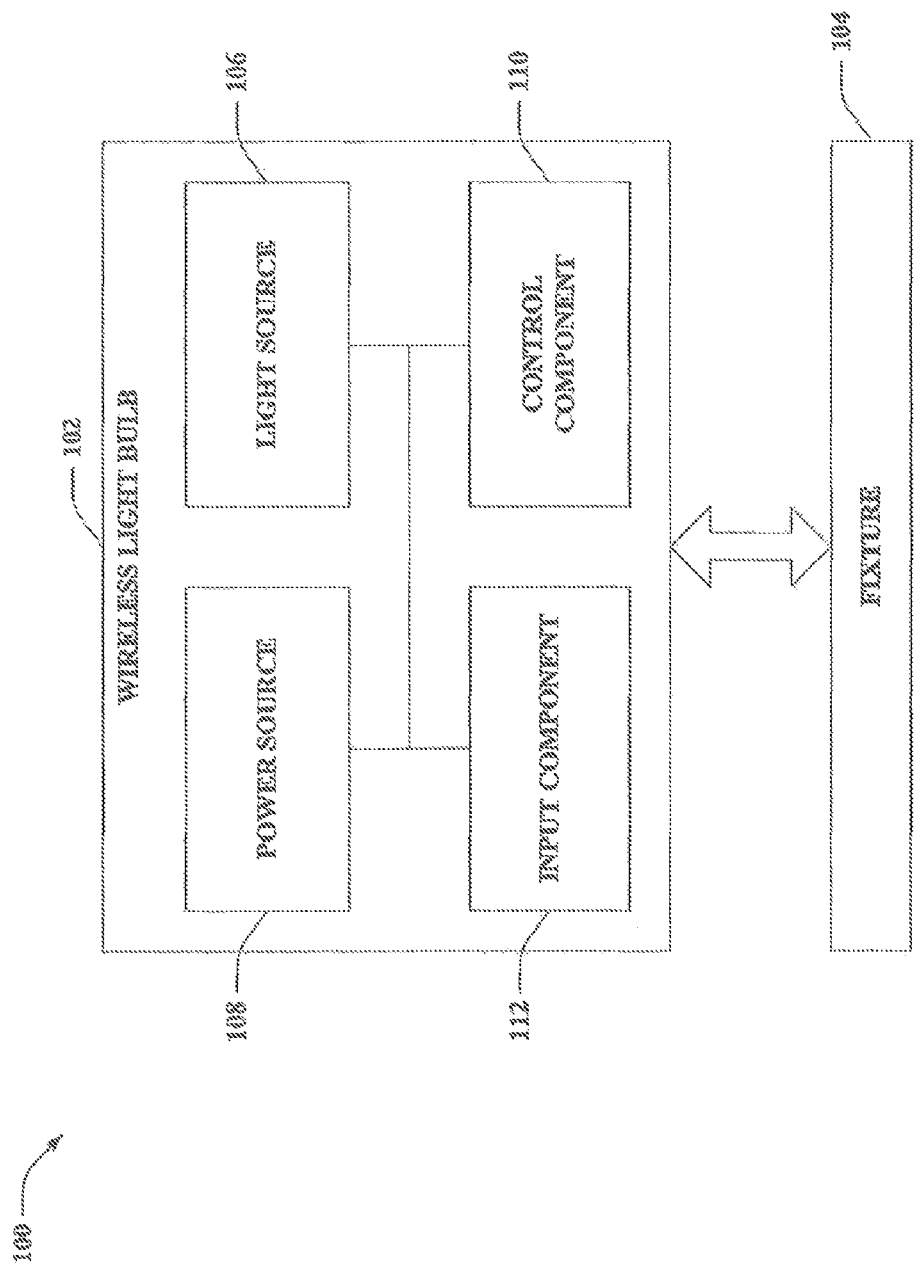
FIG. 1 illustrates a block diagram of an example wireless lighting system.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation. Moreover, it is to be appreciated that the drawings may not be to scale.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning to FIG. 1, illustrated is a block diagram of a wireless lighting system 100. The wireless lighting system 100 includes a wireless light bulb 102 that can mechanically couple to any type of fixture 104. The fixture 104 can by any size, shape, type, etc. of lighting fixture that can include any size, shape, type, etc. of socket with which the wireless light bulb 102 can physically connect. Pursuant to an illustration, the fixture 104 can be a free-standing or portable fixture, a recessed fixture, a surface mounted fixture, a sconce, a track light fixture, a pendant light fixture, an outdoor fixture (e.g., pole mounted, stantion mounted, pathway lighting fixture, . . . ), a lamp, and so forth. Thus, for example, the fixture 104 can include an Edison socket and the wireless light bulb 102 can comprise a screw base that can be physically coupled with the Edison socket of the fixture 104. Further, the wireless light bulb 102 can include any type, size, shape, etc. of fitting that can be compatible with a corresponding socket of the fixture 104 (e.g., the fitting can include a screw base, a bayonet (push-twist) base, wedge base, locking base, pin base, . . . ). Moreover, it is contemplated that the wireless light bulb 102 and the fixture 104 can be electrically coupled when mechanically coupled and/or the wireless light bulb 102 and the fixture 104 can be mechanically coupled without electrical coupling.

The wireless light bulb 102 can further include a light source 106, a power source 108, a control component 110 and/or an input component 112 (e.g., the light source 106, the power source 108, the control component 110 and/or the input component 112 can be integrated into a housing (not shown) of the wireless light bulb 102). The light source 106 can be any type, number, size, shape, etc. of lamp. For example, the light source 106 can be one or more of incandescent, halogen, gas discharge, florescent, fiber optic, induction, light emitting diode (LED), etc. source(s). According to an illustration, the light source 106 can include a plurality of LEDs that can be positioned at substantially any location with respect to one another. Following this illustration, the plurality of LEDs can be arranged in an array that can disperse light over a desired area; however, the claimed subject matter is not so limited. By way of another example, the wireless light bulb 102 can include a housing (not shown) constructed of plastic, metal, and/or substantially any matter. For instance, at least a portion of the housing can enable light emitted by the light source 106 to pass there through (e.g., at least a portion of the housing can be a light-transmitting material that can be transparent, translucent, frosted, colored, . . . ). Additionally or alternatively, light generated by the light source 106 need not traverse through the housing (e.g., the light source 106 can be positioned upon the surface of the housing and/or the light need not propagate through a light-transmitting cover).

Further, the power source 108 can be coupled to the light source 106 (and/or disparate components of the wireless light bulb 102) to supply power for operation of the light source 106 (and/or the disparate components). For instance, the power source 108 can provide direct current (DC) power to the light source 106 (and/or disparate components of the wireless light bulb 102). According to an example, the power source 108 can be one or more batteries. For instance, the power source 108 can be any number, size, and type of rechargeable (e.g., nickel-cadmium, . . . ) and/or non-rechargeable (e.g., alkaline, . . . ) batteries. Pursuant to a further illustration, the power source 108 can be a solar cell. Moreover, the power source 108 can be a combination of a solar cell and one or more batteries. Thus, for instance, a battery can supplement power supplied by the solar cell (or vice versa) and/or the solar cell can recharge a battery. In accordance with a further illustration, the power source 108 can wirelessly obtain power (e.g., to be utilized directly, employed to recharge batteries, . . . ); for instance, power can be wirelessly delivered to the power source 108 via collecting RF energy from the environment, electromagnetic induction, wave coupling, converting motion or heat to electrical energy, and the like.

By way of an example, the wireless light bulb 102 can physically couple with the fixture 104 to support the wireless light bulb 102 in a particular position, yet electrical current need not flow between the fixture 104 and the wireless light bulb 102. Thus, the fixture 104 can be installed at substantially any location without needing to supply power (e.g., via hard-wiring the fixture 104); hence, the fixture 104 can be physically placed, secured, mounted, installed, etc. in a locale without being hard-wired to a power source. In contrast, conventional techniques oftentimes employ hard-wired fixtures that can provide alternating current (AC) power to light bulbs coupled therewith.

According to another illustration, the fixture 104 can provide AC power that can be leveraged by the wireless light bulb 102 in addition to or instead of the power source 108. For example, the wireless light bulb 102 can lack the power source 108 integrated therein, and the AC power from the fixture 104 can power the wireless light bulb 102. Additionally or alternatively, the wireless light bulb 102 can include the power source 108, and the power source 108 can be a battery backup for the wireless light bulb 102, for instance. Thus, upon detecting an AC power outage, the wireless light bulb 102 can switch to utilizing the power source 108 (e.g., one or more batteries) to supply power to the wireless light bulb 102.

The wireless light bulb 102 further includes the control component 110 that manages operation of the light source 106. For instance, the control component 110 can switch the light source 106 to an on state and/or an off state. Moreover, the control component 110 can alter intensity, brightness, color (e.g., wavelength, frequency, . . . ), etc. of the light yielded by the light source 106.

The input component 112 can obtain any type of input signal that can be leveraged by the control component 110 to manipulate operation of the light source 106. Thus, the input component 112 can be a radio frequency (RF) receiver that can obtain an RF signal communicated from an RF transmitter (not shown) that can be utilized by the control component 110 to control operation of the light source 106. According to this example, the RF signal can be deciphered by the control component 110 to effectuate switching the light source 106 to an on or off state, changing a light color or a light intensity provided by the light source 106, and the like. Additionally or alternatively, the input component 112 can be one or more sensors that monitor a condition, and monitored information yielded by such sensor(s) can be utilized to effectuate adjustments associated with the light source 106. According to another example, the input component 112 can be a connector, port, etc. that couples to a disparate device, sensor, etc. to receive the input signal.

According to an example, the light source 106, the power source 108, the control component 110 and the input component 112 can be integrated into the housing of the wireless light bulb 102. Thus, the wireless light bulb 102 can be mechanically coupled with the fixture 104 and the wireless light bulb 102 can be utilized regardless whether the fixture 104 provides power (e.g., AC power and/or DC power). Moreover, conventional lighting systems can include a typical light bulb that can couple with an adapter that can sense motion, where the adapter can further couple to a socket of a light fixture, for example; however, such common sensors are oftentimes not integrated into the light bulb (e.g., due to a typical light bulb lifespan) and rather are stand alone devices. Pursuant to another illustration, the light-source 106, the control component 110 and the input component 112 can be integrated into the housing of the wireless light bulb 102, and power (e.g., AC power) can be provided from the fixture 104 when coupled thereto.

The following provides an illustration related to the system 100. For instance, any type of fixture 104 can be obtained and installed at substantially any location without needing to wire the fixture 104. Rather, the fixture 104 can be mounted, positioned, etc. and can thereafter be utilized to physically hold the wireless light bulb 102. Therefore, if a fixture is lacking in a particular location where substantial difficulty can be encountered in connection with wiring the fixture to provide power thereto if installed, the fixture can instead be physically placed, mounted, attached, etc. In the location without electrically wiring the fixture (and/or without electrically wiring a switch to control operation of the fixture). Moreover, the wireless light bulb 102 can be mechanically coupled to the fixture 104 (e.g., a fitting of the wireless light bulb 102 can be attached to a socket of the fixture 104, . . . ) and can leverage the power source 108 (e.g., one or more batteries, . . . ) and input component 112 incorporated therein as described above.

Figure 2:
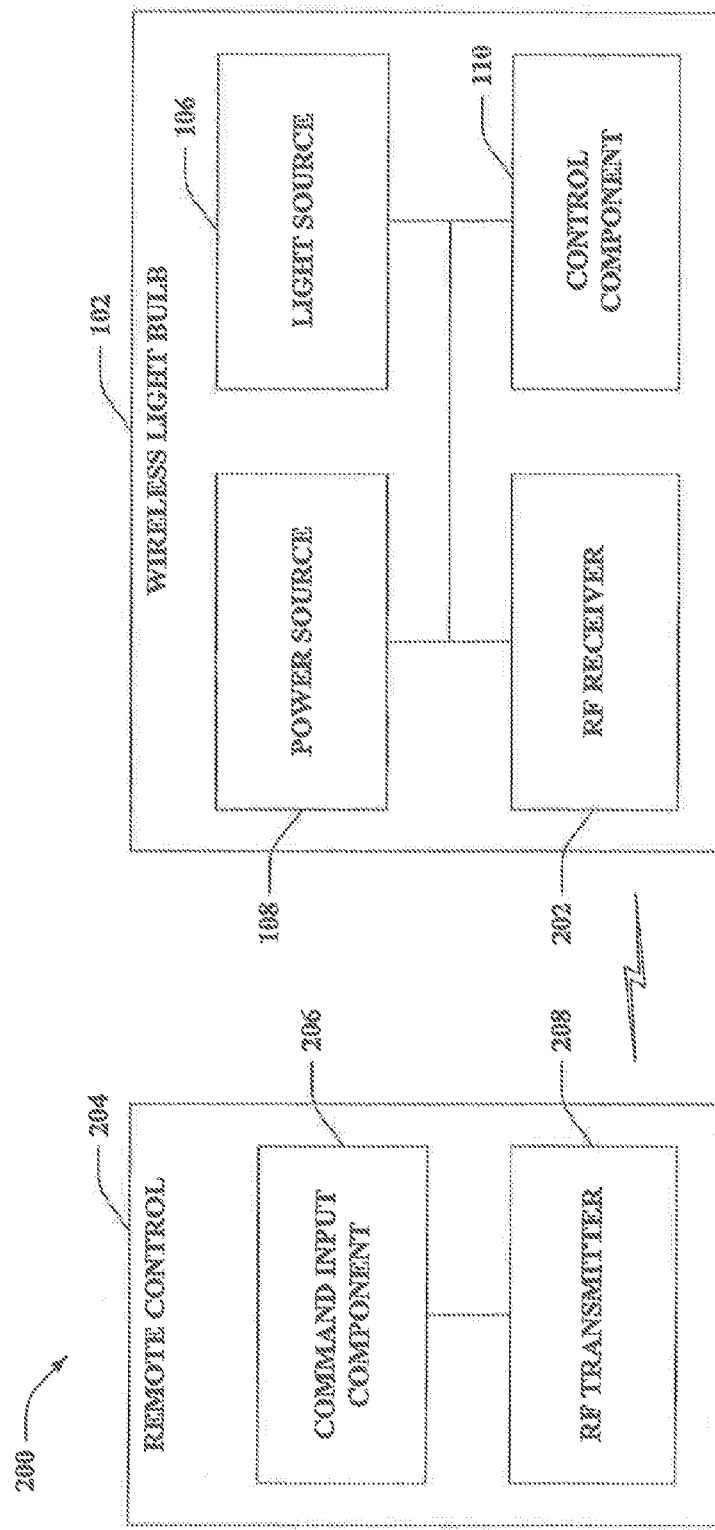
FIG. 2 illustrates a block diagram of an example wireless lighting system that utilizes RF signaling to control lighting.

Turning to FIG. 2, illustrated is a block diagram of a wireless lighting system 200 that utilizes RF signaling to control lighting. The system 200 includes the wireless light bulb 102, which can further comprise the light source 106 (e.g., LED(s), . . . ), the power source 108, and the control component 110 as described above (e.g., which can be integrated in the wireless light bulb 102). Moreover, the wireless light bulb 102 can include an RF receiver 202 that can obtain a data stream of RF signals that can be decoded and employed by the control component 110.

The RF receiver 202 can monitor for RP signals at a predetermined frequency. For instance, the RF receiver 202 can periodically monitor for RP signals. Alternatively, the RF receiver 202 can continuously monitor fir RF signals. When an RP signal is received, the signal can be decoded (e.g., by the control component 110, a processor (not shown), . . . ).

The RF receiver 202 can receive RF signals communicated by a remote control 204. The remote control 204 can be positioned at substantially any location (e.g., within range of the RF receiver 202). Moreover, the remote control 204 can be employed by a user to operate the wireless light bulb 102 from a distance. For instance, the remote control 204 can be located at the top of a stairway and can transmit RF signals to the wireless light bulb 102 positioned at the bottom of the stairway, where the wireless light bulb 102 can be mechanically coupled to a fixture located downstairs with or without electrical coupling to a power source (e.g., AC power source, . . . ). The remote control 204 can further include a command input component 206 and an RP transmitter 208. Moreover, although not depicted, it is contemplated that the remote control 204 can include a power source (e.g., one or more batteries).

According to an example, the remote control 204 can be attachable to a surface such as a wall. Pursuant to another illustration, the remote control 204 can be attachable to a keychain. However, it is contemplated that the claimed subject matter is not limited to the aforementioned examples.

The command input component 206 can be one or more buttons, dials, toggles, switches, levers, knobs, an LED touch screen, a keypad, or any such controls that can obtain user input commands. According to another illustration, the command input component 206 can be a touch screen device with which a user can interact. The command input component 206 can receive commands to switch the light source 106 on, switch the light source 106 off, toggle whether the light source 106 is on or off, dim or brighten light generated by the light source 106, change the color of the light yielded by the light source 106, and so forth.

Moreover, the RP transmitter 208 can transfer command(s) obtained via the command input component 206 to the RF receiver 202 of the wireless light bulb 102. It is contemplated, however, that an infrared (IR) receiver and transmitter can be employed in addition to or Instead of the RP receiver 202 and transmitter 208. Moreover, it is to be appreciated that the RF receiver 202 and/or RF transmitter 208 can be transceivers that can receive and transmit data. Such transceivers can enable two-way communication. Thus, for instance, the remote control 204 can be configured to repeatedly transmit a command signal until a configuration signal is received from the wireless light bulb 102. Additionally, the wireless light bulb 102 can transmit a confirmation signal upon receipt of an RF signal. According to another example, RF transceivers can enable providing the remote control 204 with feedback concerning a state associated with the wireless light bulb 102 (e.g., whether the light source 106 is in an on state, an off state, a color and/or intensity of light yielded by the light source 106, . . . ), battery life, and so forth. Moreover, RF transceivers can allow the wireless light bulb 102 to communicate with disparate wireless light bulb(s) (e.g., to repeat signals, coordinate actions, . . . ). Pursuant to a further example, the transceiver can enable sending power usage data corresponding to the wireless light bulb 102 to a disparate device (e.g., for storage, tracking, statistical analysis, . . . ).

According to another illustration, the remote control 204 can manipulate any number of wireless light bulbs similar to the wireless light bulb 102. For instance, similar changes in operation of any number of wireless light bulbs can be effectuated by the remote control 204 and/or the remote control 204 can communicate respective commands specific for any number of subsets of the wireless light bulbs. Pursuant to a further example, the remote control 204 can encrypt data communicated to the wireless light bulb 102 to provide security; therefore, the wireless light bulb 102 (e.g., the control component 110, a processor (not shown), . . . ) can decrypt the data received from the remote control 204 via the RF receiver 202.

Figure 3:
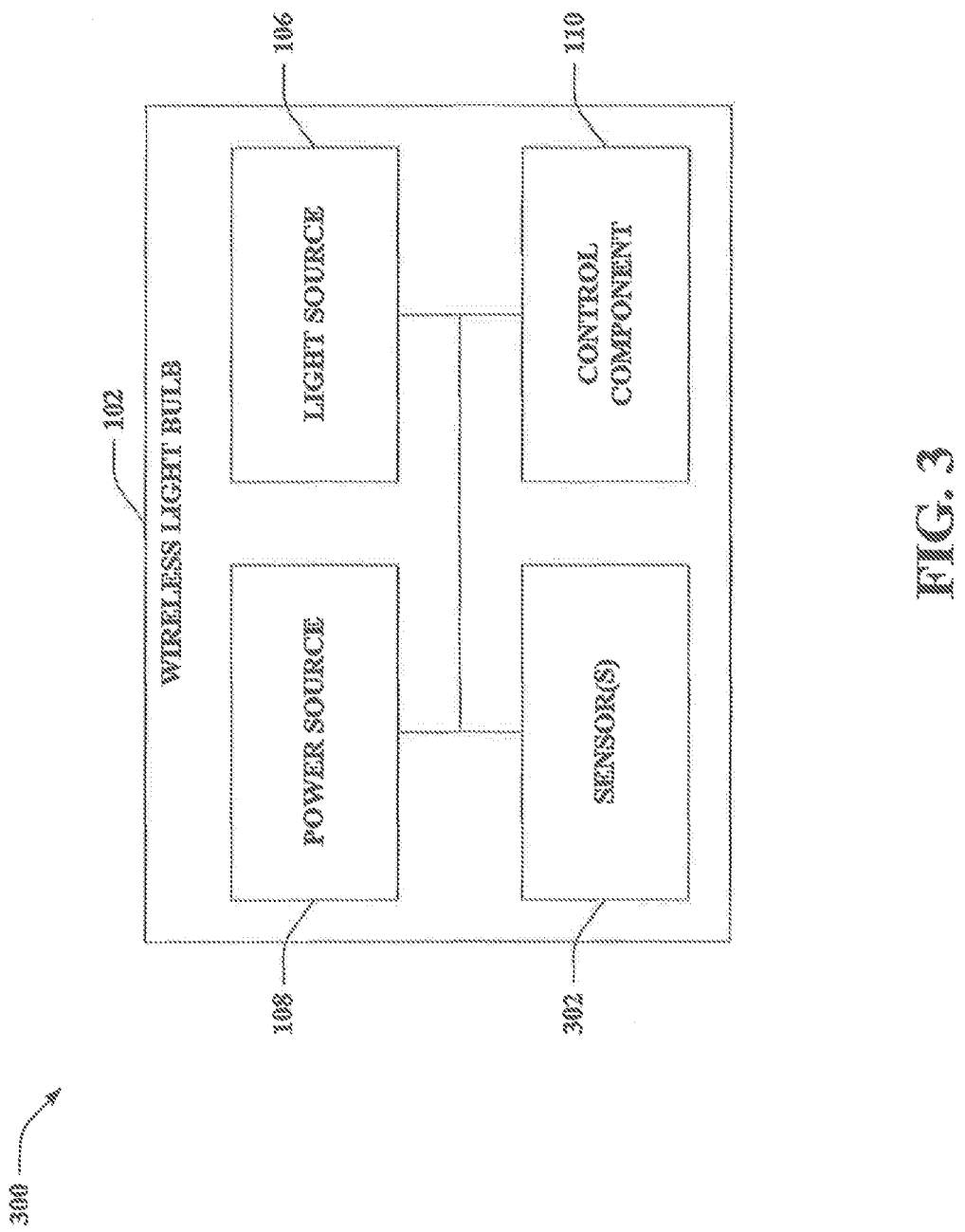
FIG. 3 illustrates another block diagram of an example system that provides wireless lighting.

Now referring to FIG. 3, illustrated is another block diagram of a system 300 that provides wireless lighting. The system 300 includes the wireless light bulb 102 that can be removeably attachable to any type of lighting fixture. Moreover, the lighting fixture can, but need not, provide power to the wireless light bulb 102. The wireless light bulb 102 can include the light source 106 (e.g., LED(s), . . . , the power source 108, and the control component 110. Moreover, the wireless light bulb 102 can include any number of sensor(s) 302. In addition to the sensor(s) 302, the wireless light bulb 102 can comprise a receiver that can obtain wireless control signals (e.g., the RP receiver 202) or can lack such a receiver. According to a further example, the sensor(s) 302 can be separate from the wireless light bulb 102 and can wirelessly transmit information to the wireless light bulb 102 to control operation thereof while lacking a wired connection to the wireless light bulb 102; however, the claimed subject matter is not so limited.

It is to be appreciated that any type of sensor(s) 302 can be utilized in connection with the claimed subject matter. For example, the sensor(s) 302 can be one or more of infrared sensors, light sensors, proximity sensors, acoustic sensors, motion sensors, carbon monoxide and/or smoke detectors, thermal sensors, electromagnetic sensors, mechanical sensors, chemical sensors, and the like. According to an illustration, the wireless light bulb 102 can include a passive infrared (PIR) sensor that can detect motion. The control component 110 can determine if the motion detected by the PIR sensor is above a predetermined threshold. If the motion is above the predetermined threshold, the control component 110 can switch the light source 106 to an on state. Moreover, the control component 110 can enable the light source 106 to emit light for a period of time (e.g., predetermined, dynamically adjusted, as long as the detected motion remains above the threshold, . . . ) prior to switching the light source 106 to an off state. By way of another illustration, the sensor 302 can be a light sensor that can monitor an amount of light in an environment (e.g., outside during differing times of day); thus, the control component 110 can enable the light source 106 to switch on when the amount of light monitored in the environment drops below a threshold (e.g., the light source 106 can turn on at night and turn off during the day). In accord with another example, the wireless light bulb 102 can be utilized in connection with providing an alarm (e.g., the wireless light bulb 102 can yield a visual alarm indication) such that the sensor 302 can detect a temperature of an environment or a temperature of the bulb itself and the control component 110 can enable operating the light source 106 based upon the observed temperature (e.g., transition the light source 106 to an on state when the temperature exceeds a threshold, . . . ). However, the claimed subject matter is not limited to the aforementioned examples.

Figure 4:
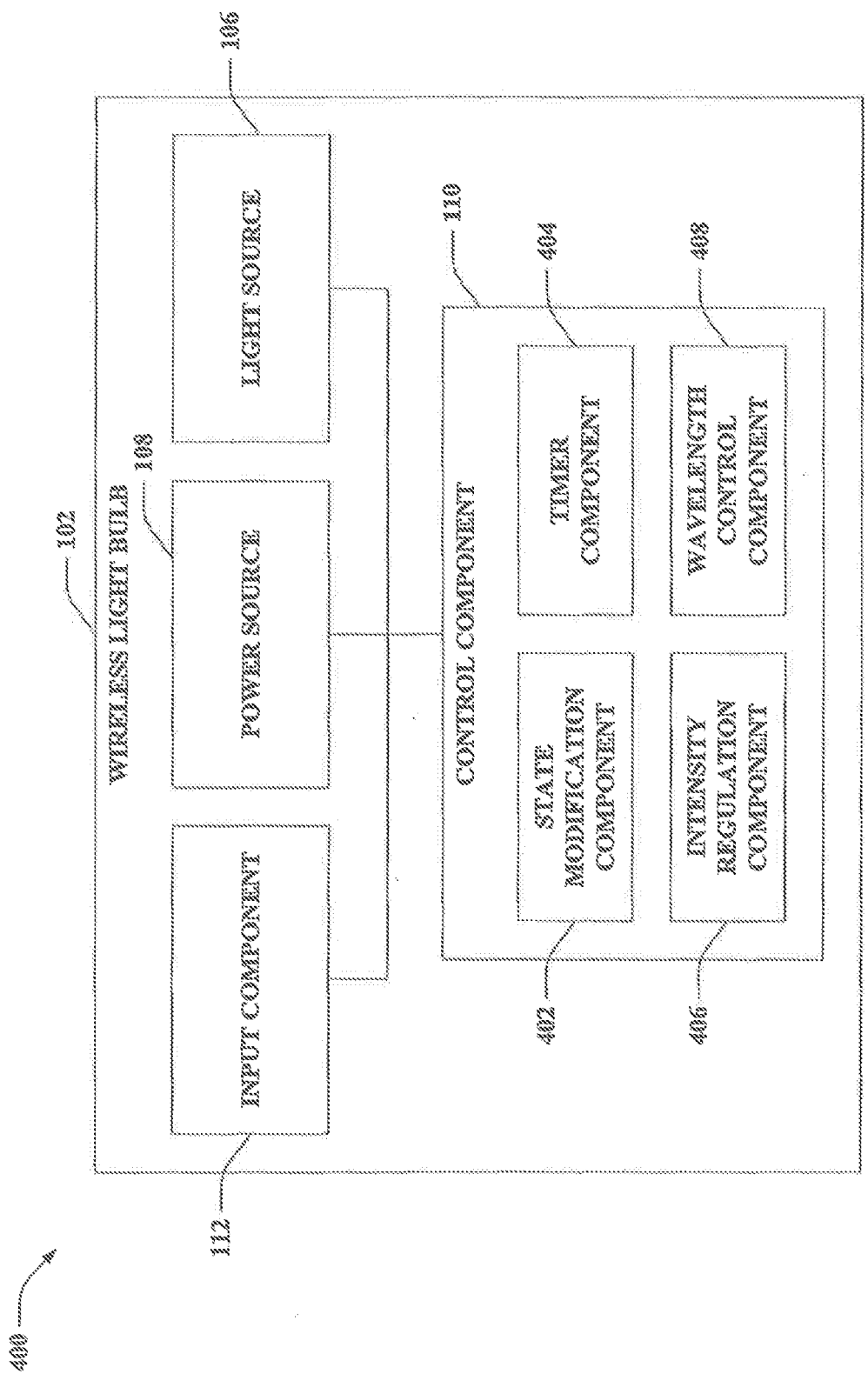
FIG. 4 illustrates a block diagram of an example system that provides illumination with a wireless light.

With reference to FIG. 4, illustrated is a block diagram of a system 400 that provides illumination with a wireless light. The system 400 includes the wireless light bulb 102 that can further comprise the light source 106 (e.g., one or more LEDs, . . . ), the power source 108, the control component 110, and/or the input component 112. The wireless light bulb 102 can be incorporated into a housing (not shown). It is contemplated that any size and/or shape housing can be employed with the wireless light bulb 102. According to another illustration, the housing can include at least a portion that is moveable (e.g., manually by a user, automatically with a motor or the like, . . . ) to allow for directing emitted light. For example, a remote control can provide a signal to manipulate a moveable portion of the housing. Moreover, the housing can orient the light source 106 in substantially any manner to provide general lighting (e.g., illuminating an indoor or outdoor area), task lighting (e.g., reading), accent lighting, and so forth.

The input component 112 can receive an input from a disparate device (e.g., the remote control 204 of FIG. 2, a stand-alone sensor, . . . ). The input component 112 can provide various adaptors, connectors, channels, communication paths, etc. to enable interaction with the disparate device. Pursuant to an illustration, the input can be wirelessly transmitted (e.g., via an RF signal, an IR signal, . . . ) from the disparate device to the input component 112; thus, the input component 112 can be a receiver and/or a transceiver that obtains the wirelessly transferred signal. By way of example, an infrared sensor or motion sensor can monitor occupancy in an environment and, upon detecting presence within the monitored environment, the sensor can transmit a wireless input to the input component 112. It is to be appreciated that any type of sensors can be utilized in connection with the claimed subject matter such as, but not limited to, infrared sensors, light sensors, proximity sensors, acoustic sensors, motion sensors, carbon monoxide and/or smoke detectors, thermal sensors, electromagnetic sensors, mechanical sensors, chemical sensors, and the like.

According to another example, any type of remote control can wirelessly communicate with the input component 112. For instance, the remote control can be a stand-alone remote control (e.g., the remote control 204 of FIG. 2) and/or incorporated into a disparate device (e.g., incorporated into a key fob, a programmable wireless transceiver integrated in an automobile, . . . ). Moreover, the remote control can be a personal computer, a cellular phone, a smart phone, a laptop, a handheld communication device, a handheld computing device, a global positioning system, a personal digital assistant (PDA), and/or any other suitable device; such devices can communicate directly with the input component 112 and/or via a network (e.g., local area network (LAN), wide area network (WAN), cellular network, . . . ). By communicating via a network, the wireless light bulb 102 can be controlled from a remote location (e.g., an individual can control the wireless light bulb 102 in her home by utilizing a device in her office, . . . ). Moreover, the aforementioned devices can be utilized to wirelessly program the wireless light bulb 102. For instance, operation of a plurality of wireless light bulbs can be programmed from a personal computer (e.g., an RF transmitter can be coupled to a USB port of the computer to communicate with the input component 112, the wireless light bulbs can be programmed to switch on and off at certain times of day, . . . ).

In accord with another example, radio frequency identification (RFID) can be utilized to provide the input to the input component 112. As such, an RFID tag associated with a user can be detected when in range of the input component 112, and lighting preferences of the particular user (e.g., retained in memory) can be effectuated in response to his or her detected presence. By way of illustration, when an individual walks into a room in her house with an RFID tag, presence of the RFID tag can be observed by the input component(s) 112 and the wireless light bulb(s) in the room can switch on, intensity, color, and/or direction of the light(s) can be altered, and so forth; however, the claimed subject matter is not so limited.

Additionally or alternatively, the input component 112 can be a sensor that can monitor a condition associated with the wireless light bulb 102 to generate the input as described in connection with FIG. 3. According to another example, the input component 112 can be a connector, port, etc. that couples to such sensor.

Further, the input component 112 can wirelessly transmit data (e.g., feedback, related to a current and/or anticipated future state, . . . ) to a remote device and/or sensor. By way of another example, the input component 112 can wirelessly communicate with an input component of a disparate wireless light bulb to enable coordinated operation between more than one wireless light bulb. Following this example, an input can be retransmitted within a network of wireless light bulbs, where the network of light bulbs can be dispersed within a geographic area.

The power source 108 can be any number and/or type of batteries. For instance, the battery can be a rechargeable battery. According to another example, the battery can be a non-rechargeable battery. The battery supplies power to the wireless light bulb 102 to enable installing moving, replacing, etc. the wireless light bulb 102 in a fixture at substantially any indoor or outdoor location while mitigating the need for expensive and time consuming wiring and/or utilization of aesthetically unpleasing and potentially inconvenient cords commonly associated with conventional lighting. Pursuant to a further example, the wireless light bulb 102 can obtain AC power from the fixture, and the AC power can supplement the power provided by the power source 108 and/or be employed instead of power from the power source 108.

According to an example, the light source 106 can be one or more LEDs. It is contemplated that any number, type, color, arrangement, etc. of LEDs can be utilized with the wireless light bulb 102. Further, the control component 110 can provide instructions to manage operation of the LED(s). For instance, the control component 110 can yield instructions to switch one or more LEDs on and/or off change an intensity of illumination (e.g., brightness), switch a wavelength of light emitted from the LEDs (e.g., to change light color), manipulate direction of illumination (e.g., by moving, rotating, etc. one or more of the LEDs) and the like. However, the claimed subject matter is not limited to the light source 106 including LED(s); rather, it is contemplated that any disparate type of light source 106 can be employed.

The control component 110 employs the input obtained by the input component 112. The control component 110 can further include a state modification component 402, a timer component 404, an intensity regulation component 406, and/or a wavelength control component 408; however, it is to be appreciated that the control component 110 can include a subset of these components 402-408. The state modification component 402 utilizes the input obtained via the input component 112 to generate an instruction to change a state of the light source 106. The state modification component 402 effectuates transitioning the light source 106 to an on state, an off state, etc. Further, the state modification component 402 can yield commands to strobe the light source 106 (e.g., periodically turning the light source 106 on and off with substantially any periodicity). According to an example, the state modification component 402 can decipher that a received input pertains to the light source 106 and/or a portion thereof (e.g., a subset of LED(s) in an LED array). Moreover, the state modification component 402 can analyze the input to determine whether to yield instructions to modify operation of the light source 106 (e.g., compare an input from a sensor to a threshold, evaluate whether a condition has been met, based upon retrieved instructions corresponding to the input retained in memory, . . . ).

The timer component 404 can operate in conjunction with the state modification component 402. For instance, the timer component 404 can enable delaying state changes. Thus, turning the light source 106 on or off can be delayed for an amount of time by the timer component 404. Further, the amount of time for the delay can be predetermined, randomly selected, included with the input obtained by the input component 112 (e.g., based on a number of times a button of a remote control is depressed, . . . ), etc. Moreover, the timer component 404 can enable turning the light source 106 on and off at certain times (e.g., to create an appearance of someone being in a house when the owner is out of town, . . . ); for instance, the timer component 404 can enable the state modification component 402 to switch the state at preprogrammed times, at times determined according to a random pattern (e.g., randomly switch the light source 106 on at different times during the day for differing lengths of time, . . . ), and so forth. Additionally, the timer component 404 can include a clock that provides an understanding of time of day, day, month, year, etc. for the wireless light bulb 102; by way of illustration, the wireless light bulb 102 can be synchronized with an individual's calendar to enable randomly turning the light source 106 on and off when the individual is known to be away from home (e.g., a vacation, meeting, and the like can be scheduled on the calendar), switching the light source 106 on when the individual is due to return home or guests are scheduled to arrive, and so forth. According to another example, the timer component 404 can conserve battery life by enabling the state modification component 402 to switch the light source 106 to an off state at a particular time of day, after an elapsed amount of time subsequent to an input that turned the light source 106 to the on state, and so forth. Pursuant to another illustration, the timer component 404 can operate in conjunction with the intensity regulation component 406 and/or the wavelength control component 408 described below.

The intensity regulation component 406 can alter the intensity (e.g., brightness) of the light source 106 based upon the received input from the input component 112. The intensity can be changed by the intensity regulation component 406 adjusting a proportion of LEDs in an on state to LEDs in an off state when the light source 106 includes an LED array. Additionally or alternatively, the intensity regulation component 406 can control the intensity of light emitted by each of the LEDs in such an array. According to an example, the input component 112 can obtain RFID related input that identifies the presence of a particular user, and this user can have lighting preferences stored in memory (not shown) associated with the wireless light bulb 102. Following this example, the particular user's preferences may indicate that she desires dim lighting, which can be effectuated by the intensity regulation component 406. Pursuant to another example, upon a smoke detector or carbon monoxide detector sensing smoke or carbon monoxide, respectively, the intensity regulation component 406 can increase the brightness of the illumination of the light source 106 to a highest level (e.g., while the state modification component 402 can strobe the light source 106, the wavelength control component 408 can change the color, . . . ). It is to be appreciated, however, that the claimed subject matter is not limited to the aforementioned examples.

The wavelength control component 408 can change the wavelength (e.g., color) of light generated by the light source 106 as a function of the input obtained by the input component 112. For example, the light source 106 can include color changing LEDs, and the wavelength control component 408 can yield commands to adjust the color based upon the input obtained by the input component 112. By way of another example, subsets of LEDs included in the light source 106 can yield differing colors, and the wavelength control component 408 can select which of the LED subsets to turn to the on state to yield the desired color.

By way of further illustration, the control component 110 can include memory (not shown) that can retain instructions, commands, settings, preferences, calendar data, etc. associated with the wireless light bulb 102; additionally or alternatively, the memory can be separate from the control component 110 (e.g., the wireless light bulb 102 can include the memory and/or the memory can be separate from the wireless light bulb 102). Pursuant to an example, a user can create a lighting profile that regulates operation of the wireless light bulb 102; the lighting profile can be stored in memory and thereafter retrieved (e.g., upon receipt of input via the input component 112, . . . ) for use by the control component 110 (and/or the state modification component 402, the timer component 404, the intensity regulation component 406, the wavelength control component 408, . . . ). The memory can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The memory of the subject systems and methods is intended to comprise, without being limited to, these and any other suitable types of memory. In addition, it is to be appreciated that the memory can be a server, a database, a hard drive, and the like. Further, the control component 110 (and/or the wireless light bulb 102) can include a processor (not shown) to execute instructions described herein.

Figure 5:
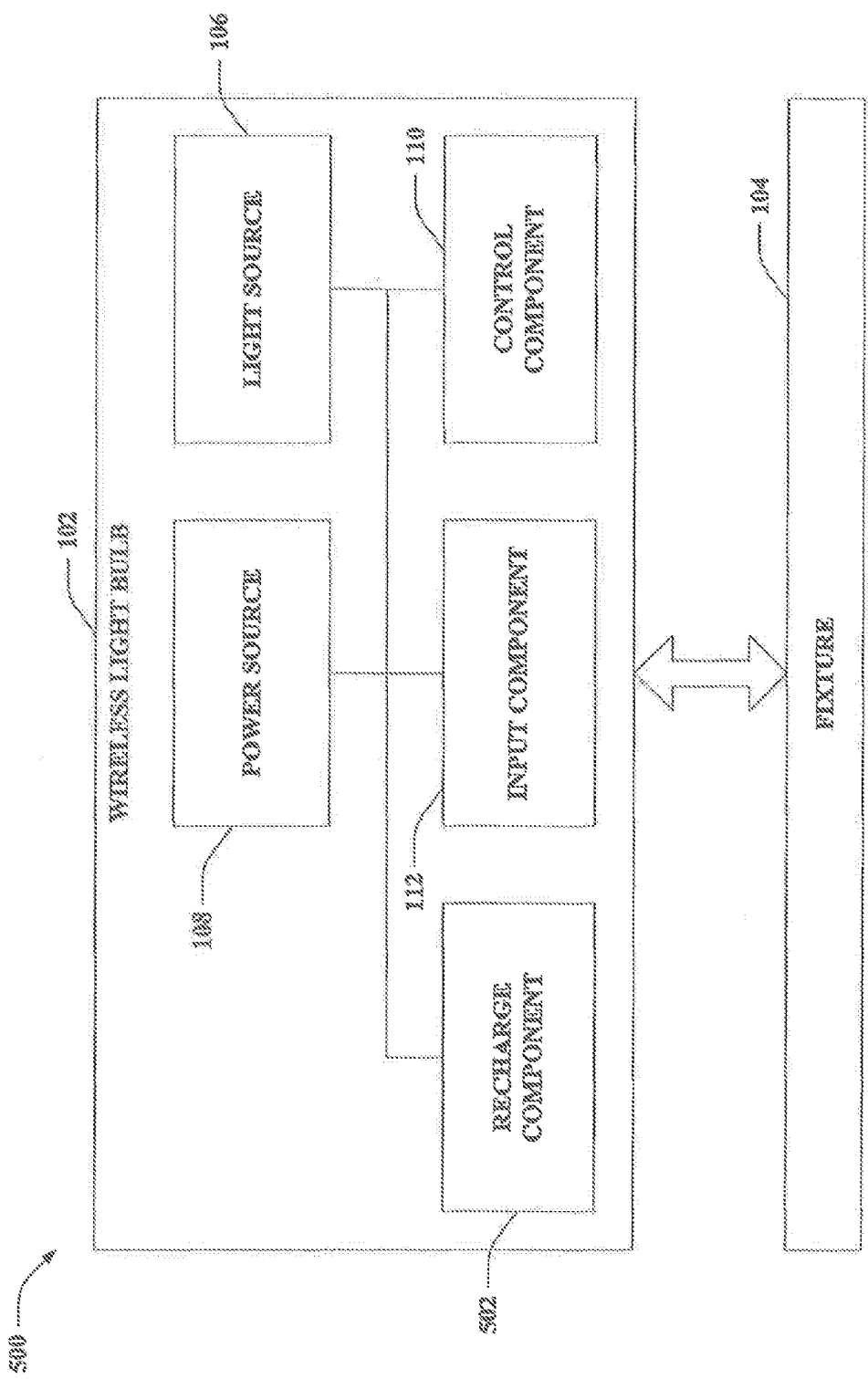
FIG. 5 illustrates a block diagram of an example system that recharges a power source integrated within a wireless light bulb.

Now referring to FIG. 5, illustrated is a system 500 that recharges a power source (e.g., the power source 108) integrated within a wireless light bulb (e.g., the wireless light bulb 102). The system 500 can include the wireless light bulb 102 and the fixture 104. The wireless light bulb 102 can further include the light source 106 (e.g., LED(s), . . . ), the power source 108, the control component 110, and/or the input component 112. The wireless light bulb 102 can also include a recharge component 502 that can recharge the power source 108. For example, the recharge component 502 can enable recharging the power source 108 when the power source 108 comprises one or more rechargeable batteries. The light source 106 can generate light while the recharge component 502 recharges the power source 108 (e.g., the wireless light bulb 102 can be a battery backed up AC light bulb, . . . ), for instance; however, the claimed subject matter is not so limited.

In accordance with an illustration, extended use of the wireless light bulb 102 can decrease a charge of the power source 108. For instance, the wireless light bulb 102 can be utilized with a fixture (e.g., the fixture 104) that lacks a connection to a power source (e.g., electrically wired to an AC power source); hence power for operation of the wireless light bulb 102 can be provided by the power source 108. To replenish the charge of the power source 108, the wireless light bulb 102 can be removed from the fixture 104 and can be coupled to a charger (not shown), for example. When connected to the charger, the recharge component 502 can increase the charge of the power source 108. Following another example, the recharge component 502 can increase the charge of the power source 108 when the wireless light bulb 102 is coupled to a fixture (e.g., the fixture 104) that is electrically connected to an AC power source. Therefore, upon charge depletion of the power source 108 of the wireless light bulb 102 when connected to a fixture that lacks a connection to an AC power source, the wireless light bulb 102 can be moved to a fixture that is hard-wired to an AC power source to enable recharging. Additionally, where the fixture 104 is a lamp, the lamp can be unplugged (e.g., when it is desired to utilize the lamp positioned at a distance from an outlet longer than a length of a cord of the lamp, . . . ) and the wireless light bulb 102 can operate by leveraging the power source 108, and thereafter, the lamp can be plugged into an outlet to allow the recharge component 502 to increase the charge of the power source 108. According to another illustration, the recharge component 502 can be a solar cell (or a plurality of solar cells) that can increase the charge of the power source 108.

Figure 6:
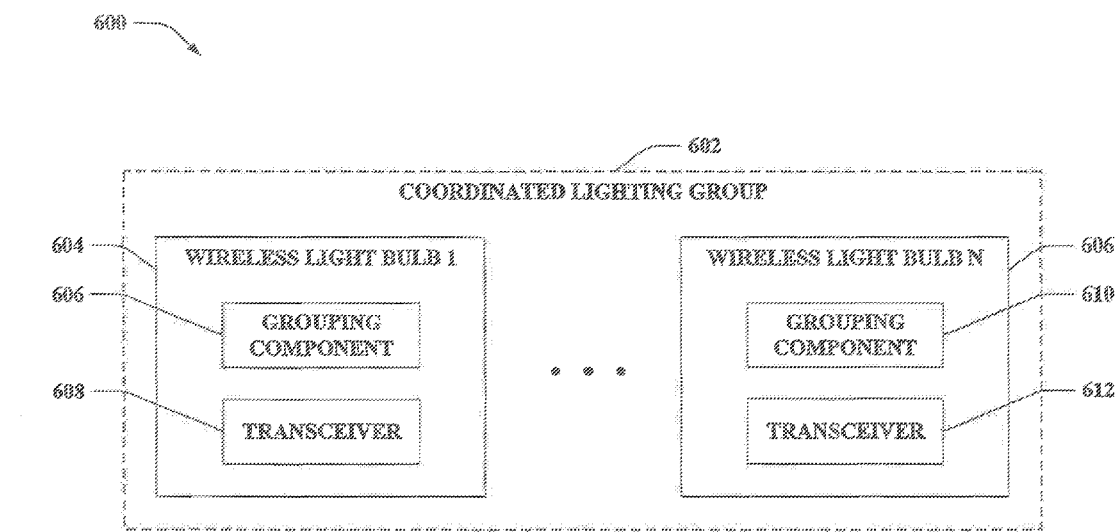
FIG. 6 illustrates a block diagram of an example system that coordinates operation of a set of wireless light bulbs.

Turning to FIG. 6, illustrated is a system 600 that coordinates operation of a set of wireless light bulbs. The system 600 includes a coordinated lighting group 602 which can include N wireless light bulbs 604-606, where N can be substantially any integer. The N wireless light bulbs 604-606 can each be substantially similar to the wireless light bulb 102 described above. Moreover, each of the wireless light bulbs 604-606 can include a respective grouping component and transceiver (e.g., wireless light bulb 1 604 can include a grouping component 608 and a transceiver 610 and wireless light bulb N 606 can include a grouping component 612 and a transceiver 614, . . . ).

The wireless light bulbs 604-606 in the coordinated lighting group 602 can be controlled with a common remote control (e.g., the remote control 204 of FIG. 2) and/or sensor(s), for instance. According to another example, operation of the wireless light bulbs 604-606 or a subset thereof can be coordinated. Thus, at least a subset of the wireless light bulbs 604-606 can concurrently switch from an on state to an off state, or vice versa, when the respective transceivers 608, 612 obtain such an input signal from the common remote control and/or sensor(s). It is to be appreciated that the coordinated lighting group 602 can be programmed in substantially any manner to manage operations of the wireless light bulbs 604-606 as a group.

The grouping components 606, 610 can enable the coordinated lighting group 602 to be assembled. For instance, the grouping components 606, 610 can allow each of the wireless light bulbs 604-606 to be assigned to operate upon a particular RF frequency (e.g., channel). Thus, the grouping components 606, 610 can select the channel corresponding to the coordinated lighting group 602 for each respective wireless light bulb 604-606. For example, the channel can be user selected, preprogrammed, randomly generated, previously stored in memory, etc. According to another illustration, the grouping components 606, 610 can learn the channel related to the coordinated lighting group 602. Following this illustration, when initializing the wireless light bulb 1 604, the transceiver 608 can obtain a setup signal from a remote control, sensor, etc. associated with the coordinated lighting group 602, and the grouping component 606 can utilize the setup signal to learn the channel associated with the remote control, sensor, etc. However, it is contemplated that the claimed subject matter is not limited to the aforementioned examples.

Figure 7:
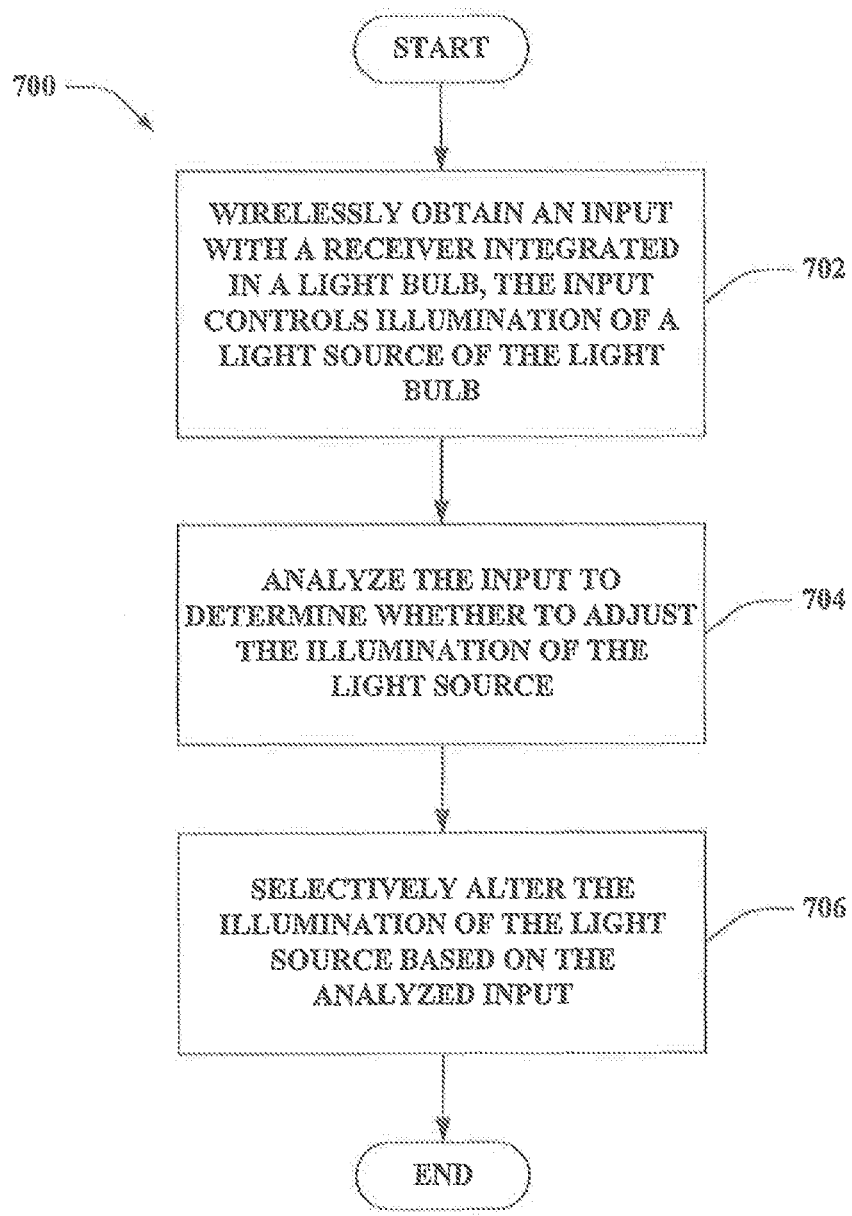
FIG. 7 illustrates a methodology that facilitates selectively emitting light in accordance with a wireless input.
Figure 8:
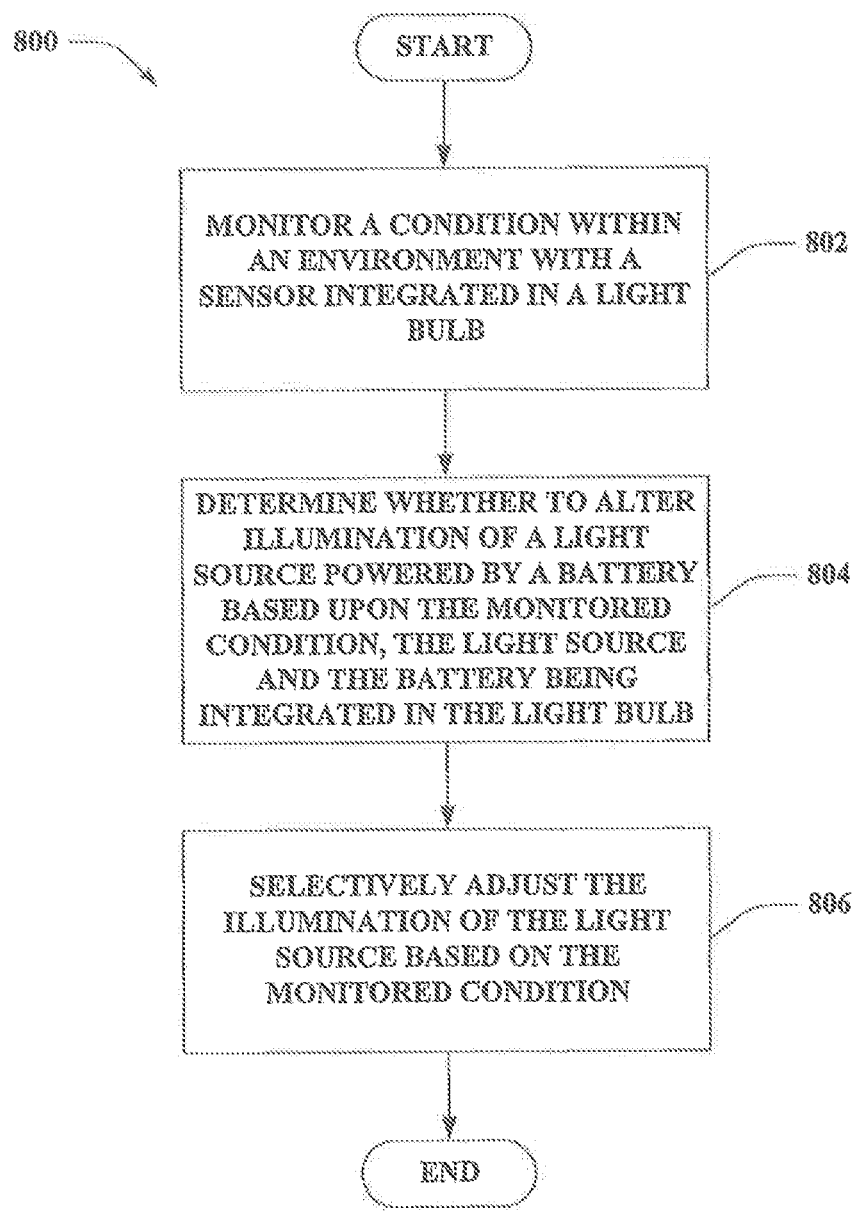
FIG. 8 illustrates a methodology that facilitates selectively emitting light based upon input from a sensor.

FIGS. 7-8 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

With reference to FIG. 7, illustrated is a methodology 700 that facilitates selectively emitting light in accordance with a wireless input. At 702, an input can be wirelessly obtained with a receiver integrated in a light bulb. The input can control illumination of a light source of the light bulb. Further, the input can be obtained from any type of source (e.g., remote control, disparate wireless light bulb, differing device, sensor, . . . ). Moreover, the input can be provided from the source via an RP signal, an IR signal, and so forth. At 704, the input can be analyzed to determine whether to adjust the illumination of the light source. For example, the light source can include one or more LEDs. Following this example, if the input provides a command to toggle the state of the LEDs, then an instruction can be yielded to switch the LEDs from an on state to an off state (or vice versa). At 706, the illumination of the light source can be selectively altered based on the analyzed input. For example, the light source can be switched to an on state or an off state, the intensity or color of light emitted by the light source can be modified, and the like.

Turning now to FIG. 8, illustrated is a methodology 800 that facilitates selectively emitting light based upon input from a sensor. At 802, a condition within an environment can be monitored with a sensor integrated in a light bulb. The sensor, for example, can be one or more infrared sensors, light sensors, proximity sensors, acoustic sensors, motion sensors, carbon monoxide and/or smoke detectors, thermal sensors, electromagnetic sensors, mechanical sensors, chemical sensors, and the like. At 804, a determination can be effectuated regarding whether to alter illumination of a light source powered by a battery based upon the monitored condition, where the light source and the battery can be integrated in the light bulb. For example, the determination can be made by comparing the monitored condition to a threshold. Additionally, the determination can be based at least in part upon considerations related to a current state associated with the light source, a charge level of the battery, and so forth. At 806, the illumination of the light source can be selectively adjusted based on the monitored condition. Pursuant to an illustration, the light source can be switched to an on state when a darkness level exceeds a threshold (e.g., at night) and thereafter the light source can be transitioned to an off state when the amount of light increases (e.g., during the day); it is contemplated, however, that the claimed subject matter is not so limited.

Figure 9:
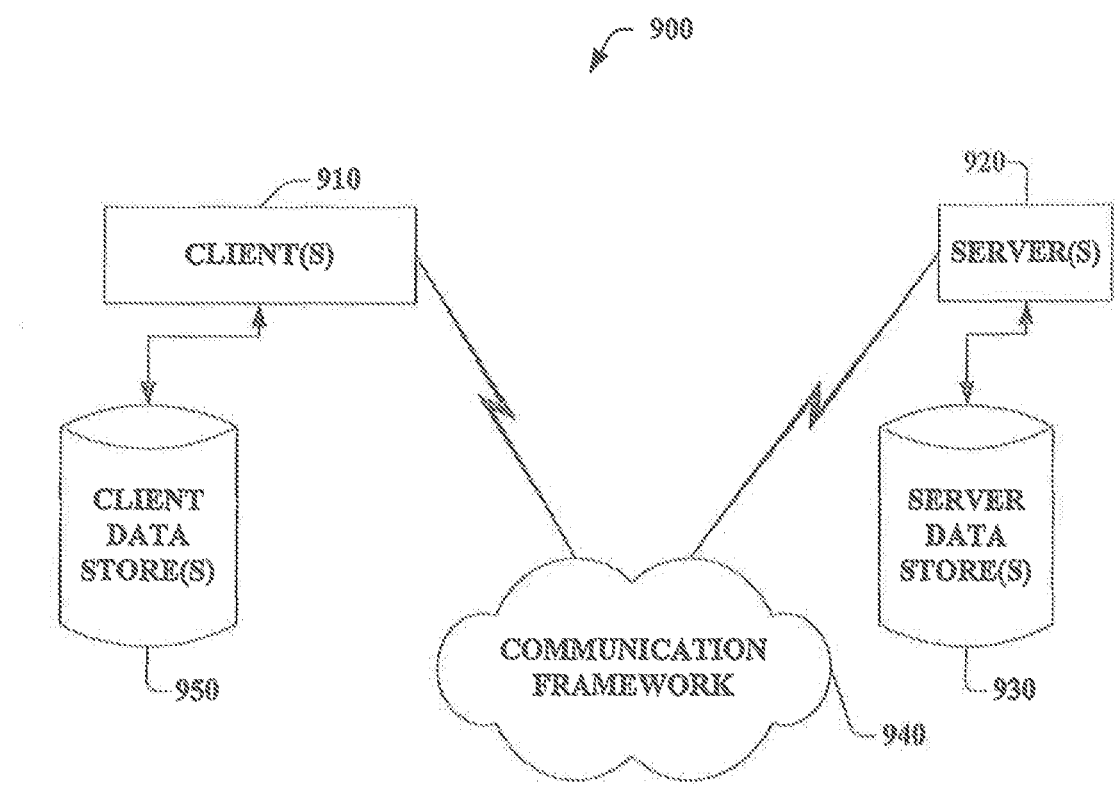
FIG. 9 illustrates an example networking environment, wherein the novel aspects of the claimed subject matter can be employed.
Figure 10:
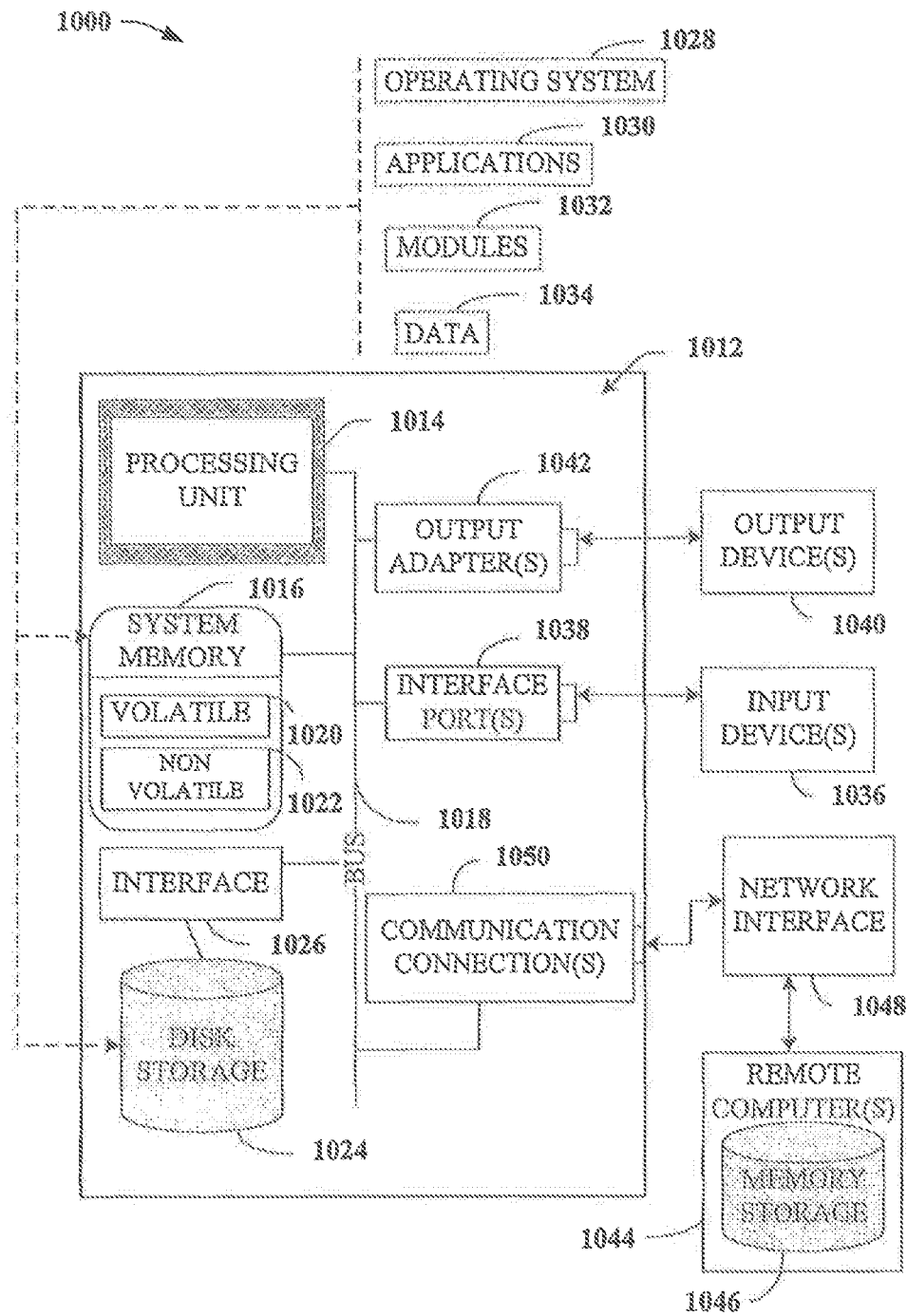
FIG. 10 illustrates an example operating environment that can be employed in accordance with the claimed subject matter.

In order to provide additional context for implementing various aspects of the claimed subject matter, FIGS. 9-10 and the following discussion is intended to provide a brief general description of a suitable computing environment in which the various aspects of the subject innovation may be implemented. For instance, FIGS. 9-10 set forth a suitable computing environment that can be employed in connection with programming, controlling, coordinating, monitoring, etc. one or more wireless light bulbs described herein. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types. It is to be appreciated, however, that the claimed subject matter is not limited to being employed in connection with the example computing environment set forth in FIGS. 9-10.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A wireless lighting system, comprising:
a housing; and
a wireless light bulb associated with the housing and including at least one light emitting diode (LED),
a wireless transceiver,
a motion sensor, and
a control component,
wherein the wireless transceiver is configured to wirelessly communicate with a remote control, wherein the remote control is a cellular phone, and wherein the wireless transceiver is further configured to receive a command signal from the remote control and provide the command signal to the control component, which is configured to manage operation of the at least one LED based on the command signal,
wherein the control component is configured to receive a motion indication from the motion sensor; and
wherein the control component is configured to transmit via the wireless transceiver, to the remote control, a signal indicative of a detected motion or proximity of an object.

2. The wireless lighting system of claim 1, the housing further comprising a fitting that mechanically couples with a socket of a lighting fixture.

3. The wireless lighting system of claim 1, wherein the wireless transceiver of the wireless light bulb is configured to receive the command signal from the remote control via a radio frequency signal or an infrared signal.

4. The wireless lighting system of claim 1, wherein the wireless transceiver of the wireless light bulb is configured to receive the command signal from the remote control via at least one of a local area network (LAN) and a wide area network (WAN).

5. The wireless lighting system of claim 1, wherein the remote control is a smart phone.

6. The wireless lighting system of claim 1, wherein the control component is configured to modify a state of the at least one LED, alter an intensity of light emitted by the at least one LED, or change a color of the light produced by the at least one LED based on commands associated with the command signal received from the remote control.

7. The wireless lighting system of claim 1, wherein the wireless transceiver of the wireless light bulb is configured to receive the command signal from the remote control via a cellular network.

8. A wireless lighting system, comprising:
a housing; and
a wireless light fixture associated with the housing and including at least one light emitting diode (LED),
a wireless transceiver,
a motion sensor,
a power source, and
a control component,
wherein the wireless transceiver is configured to wirelessly communicate with a remote control, wherein the remote control is a cellular phone, and wherein the wireless transceiver is further configured to receive a command signal from the remote control and provide the command signal to the control component, which is configured to manage operation of the at least one LED or cause the power source to provide power to the at least one LED based on the command signal,
wherein the control component is configured to receive a motion indication from the motion sensor, and
wherein the control component is configured to transmit via the wireless transceiver, to the remote control, a signal indicative of a detected motion or proximity of an object.

9. The wireless lighting system of claim 8, the housing further comprising a fitting that mechanically couples with a socket of a lighting fixture.

10. The wireless lighting system of claim 9, wherein the lighting fixture lacks a hard-wired connection to an alternating current (AC) power source.

11. The wireless lighting system of claim 9, wherein the lighting fixture provides a disparate source of power for the control component, the wireless transceiver and the at least one LED in addition to the power source.

12. The wireless lighting system of claim 11, wherein the lighting fixture is hard-wired to an alternating current (AC) power source that provides the disparate source of power.

13. The wireless lighting system of claim 8, wherein the control component is configured to modify a state of the at least one LED, alter an intensity of light emitted by the at least one LED, or change a color of the light provided by the at least one LED based on the command signal received from the remote control.

14. The wireless lighting system of claim 8, wherein the wireless transceiver of the wireless light fixture is configured to receive the command signal wirelessly from the remote control via a cellular network.

15. The wireless lighting system of claim 8, wherein the wireless transceiver of the wireless light fixture is configured to receive the command signal wirelessly from the remote control via a radio frequency signal or an infrared signal.

16. The wireless lighting system of claim 8, wherein the wireless transceiver of the wireless light fixture is configured to receive the command signal wirelessly from the remote control via at least one of a local area network (LAN) and a wide area network (WAN).

\* \* \* \* \*